Patented May 10, 1938

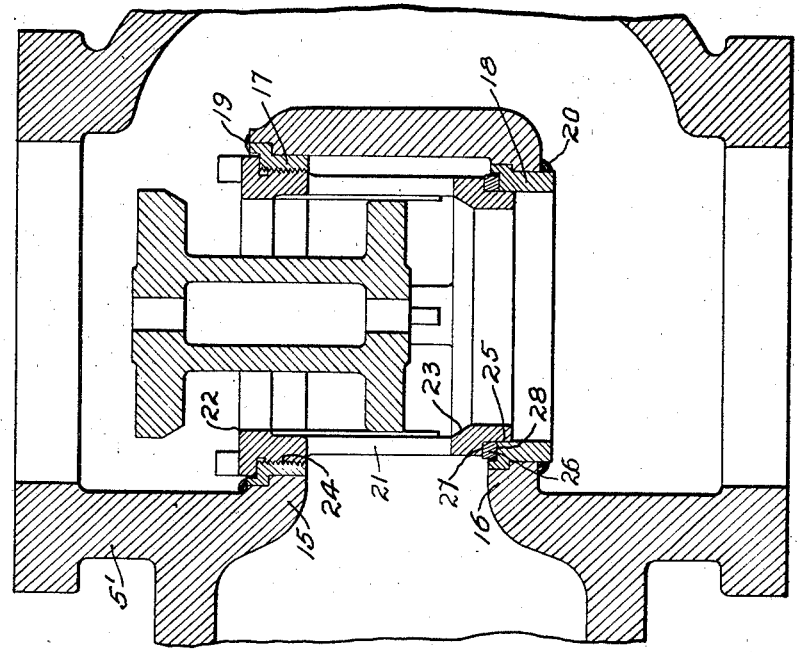
May 10, 1938. P. SPENCE 2,117,044
VALVE SEAT DEVICE
Filed May 7, 1935
INVENTOR
*Paulsen Spence*
BY
ATTORNEYS.

2,117,044

UNITED STATES PATENT OFFICE 2,117,044

VALVE SEAT DEVICE

Paulsen Spence, East Orange, N. J.

Application May 7, 1935, Serial No. 20,119

6 Claims. (Cl. 251—167)

My invention relates to a valve and more particularly to a valve body and seat means for high pressure fluids such as steam.

It is a well known fact that high pressure steam and other fluids if permitted to leak past a valve seat, for example, will cut the seat away and it has therefore become common practice to thread a renewable valve seat into the valve body so that if a leak should develop and the valve seat should be cut, the valve seat may be replaced by a new one. Furthermore, even if the valve seat be made of hard metal resistant to the effect of high pressure steam or other fluids, a slight leak may develop between the valve body and the valve seat, and the valve body being of relatively soft metal will be cut and the leak become progressively worse. When the valve body is thus cut it must be discarded or relatively expensive repairs made.

It is the principal object of my invention to provide a valve seat means which will prevent the cutting of the valve body due to leakage of steam or other fluid and in which a valve seat ring is readily removable.

It is a further object to improve certain features of a valve body and seat arrangement with a view to increasing the life and usefulness of the valve.

It is another object to provide a valve body with a readily renewable seat ring and means for preventing leakage past the valve body adjacent the seat ring so as to avoid cutting the body.

Other objects and features of invention will be apparent or will be hereinafter pointed out.

In the drawing which shows, for illustrative purposes only, preferred embodiments of the invention—

Fig. 1 is a sectional view through a single seated valve, illustrating features of the invention;

Fig. 2 is a similar view of a double seated valve.

In Fig. 1, 5 indicates a valve body which may be made of any suitable material. Generally speaking, for high pressure steam the valve body would be made of cast steel. In the partition 6 which defines a valve seat opening I provide a valve seat adapter 7 integrally secured to the valve body so that it is hermetically sealed and there is no possibility of leakage between the valve body and the valve seat adapter. The adapter 7 is preferably made of relatively hard metal such as heat treated steel or steel of such composition that it is highly resistant to the cutting action of high pressure steam or other fluid. In this specification I wish it understood that when I refer to parts such as the adapter 7 being of relatively hard metal I mean material which is highly resistant to the cutting action of steam or other high pressure fluid.

In the form shown in Fig. 1, the adapter 7 is integrally joined to the valve body by being cast integrally therewith, that is to say, the adapter 7 is placed in the mold and the metal of the body 5 is poured so as to surround and be integrally joined to the adapter. The adapter may be provided with thin fins or other projecting portions as indicated at 8, so that with certain metals the fins being thin will be fused and therefore integrally a part of the valve body 5 so as to avoid any possibility of leakage of steam between the valve body and the adapter 7. The adapter 7 is preferably threaded on the inside to receive a renewable valve seat member 9 which is preferably also of relatively hard metal so as to be resistant to the cutting action of high pressure steam. The valve having a valve disk 10 of suitable material preferably resistant to the cutting action of high pressure steam, fits the valve seat 9 in the usual manner.

Now, since the adapter 7 and the valve seat 9 are both of relatively hard metal, it makes little difference if a small leak should develop between the parts 7 and 9 since both of those parts are of hard metal and would not be cut away to any extent by a small leak. However, with a valve body 5 even of cast steel, if a leak develops between such body and a valve seat threaded therein as is now common practice, the valve body would soon be so cut as to ruin it. Should the seat 9 become worn or cut due to the normal and intended passage of high pressure steam between its valve seat surface and valve disc 10, the seat member 9 may be readily renewed and the valve body will last indefinitely.

In the form shown in Fig. 2 the body 5' is provided with a double partition 15—16, each of the partitions being apertured for the reception of hard metal adapters 17—18. An alternative method of securing the adapters in place is employed. These adapters are not cast integrally with the valve body but are made to fit seats in the partitions 15—16 and are then integrally secured in place so as to form a hermetic seal by welding as indicated at 19—20. Such welding makes the adapters 17—18 and the valve body integral and leak proof. For the double seated valve arrangement shown I provide a valve cage 21 of relatively hard metal and having a valve seat 22 at the top and a second valve seat 23 at the bottom. In the form shown the cage 21 is threaded as indicated at 24 to the adapter 17 and has a sliding fit as indicated at 25 with the lower adapter 18. The lower adapter 18 may be recessed as at 26 and the seat 21 is shouldered at 27 so as to provide a recess for a packing member 28 of suitable material which is slightly compressible. Thus, when the cage 21 is screwed in place, the packing 28 will be compressed and assist in providing a very tight joint between the cage 21 and the adapter 18 and a tight joint between the adapter 17 and the cage is provided by the screw threaded joint and the interfitting parts at the top. By the means described a unitary cage member may be provided, threaded or otherwise detachably secured at only one end and yet a tight joint may be provided at both ends. During expansion of the cage member 21 relatively to the valve body, the packing 28 may be compressed and a tight joint will always be maintained. As heretofore stated, since the valve adapters are integrally secured to and practically become a part of the valve body, there is practically no possibility of leakage of steam between the relatively soft body and the adapters. Since the renewable valve seats may also be made of relatively hard metal, there will be substantially no cutting action between the adapters and the valve seats, even though slight leaks should develop.

While the invention has been described in considerable detail and two embodiments illustrated, it is to be understood that various changes and modifications may be made within the scope of the invention as defined in the appended claims.

I claim:

1. In a valve, a valve body of relatively soft metal, a valve seat adapter of relatively hard metal integrally secured to said body so as to form a hermetic seal, and a valve seat member of relatively hard metal detachably secured to said valve seat adapter.

2. In a valve, a valve body of relatively soft metal, a valve seat adapter of relatively hard metal, said valve seat adapter having thin fins thereon integrally joined to said valve body, and a valve seat secured to said valve seat adapter.

3. In a valve, a valve body of relatively soft metal, a valve seat adapter of relatively hard metal, said valve body and valve seat adapter being cast integrally with each other for the purpose described and a valve seat ring detachably secured to said valve seat adapter.

4. In a valve, a valve body of relatively soft metal, a valve seat adapter ring of relatively hard metal integrally secured to said valve body so as to form a hermetic seal, and a valve seat member screw threaded to said valve seat adapter.

5. In a double ported valve, a valve body having spaced apart partitions, a valve seat adapter integrally secured to each of said partitions so as to be hermetically sealed therein, a valve seat means secured to each of said valve seat adapters, and a valve member to coact with said valve seat means.

6. In a valve, a valve body of relatively soft metal, a valve seat adapter ring of relatively hard metal hermetically sealed in said valve body, and a valve seat member removably secured to said valve seat adapter.

PAULSEN SPENCE.